United States Patent [19]

Reynolds

[11] Patent Number: 5,850,596
[45] Date of Patent: Dec. 15, 1998

[54] METHOD AND SYSTEM FOR MAKING UNLICENSED PRIORITY TRANSMISSIONS

[75] Inventor: Kevin Reynolds, Plano, Tex.

[73] Assignee: MCI Corporation, Washington, D.C.

[21] Appl. No.: 449,838

[22] Filed: May 24, 1995

[51] Int. Cl.⁶ .................................................. H04B 1/10
[52] U.S. Cl. .......................... 455/63; 455/63; 455/67.1; 455/54.1; 370/69.1
[58] Field of Search ................................. 455/33.1, 34.1, 455/34.2, 54.1, 56.1, 63, 67.1; 370/69.1

[56] References Cited

U.S. PATENT DOCUMENTS

| | | |
|---|---|---|
| 4,528,656 | 7/1985 | Morais . |
| 4,989,230 | 1/1991 | Gillig et al. . |
| 5,117,449 | 5/1992 | Metroka et al. . |
| 5,127,042 | 6/1992 | Gillig et al. . |
| 5,133,081 | 7/1992 | Mayo . |
| 5,133,083 | 7/1992 | Crilly, Jr. et al. ...................... 455/67.1 |
| 5,212,684 | 5/1993 | MacNamee et al. . |
| 5,260,988 | 11/1993 | Schellinger et al. . |
| 5,295,138 | 3/1994 | Greenberg et al. .................... 370/69.1 |
| 5,303,287 | 4/1994 | Laborde . |
| 5,367,558 | 11/1994 | Gillig et al. . |
| 5,396,653 | 3/1995 | Kivari et al. . |

Primary Examiner—Reinhard J. Eisenzopf
Assistant Examiner—Tuyen Q. Vu

[57] ABSTRACT

A first PCS unit monitors carrier activity of other PCS units in an unlicensed frequency band adjacent to a licensed frequency band used by the first PCS unit, which has a microprocessor that compiles a history table of this other carrier activity. The first PCS unit then uses the history table to transmit on the licensed frequency band an interference signal synchronized with the predicted occurrence of the other carrier activity such that the permitted sideband signals of the interference signal in the adjacent unlicensed band causes the other PCS units to stop broadcasting on the adjacent unlicensed band. The first PCS unit then begins broadcasting on both the adjacent unlicensed band and the licensed band, a message being embedded in these broadcasts to advise intended receiving PCS units that both bands are now available for communication sessions with the first PCS unit.

16 Claims, 8 Drawing Sheets

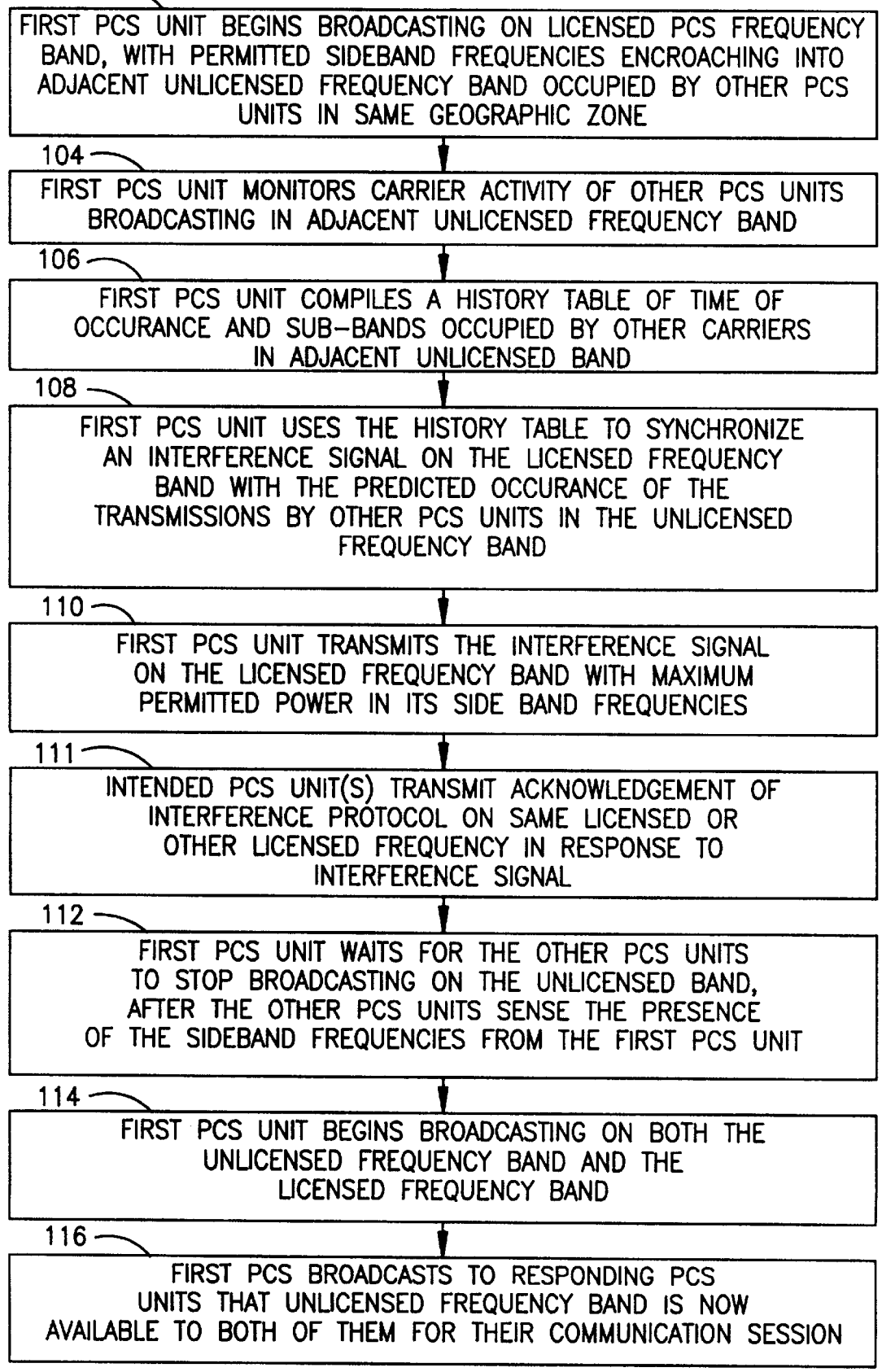

SIDEBAND SIGNAL STRENGTH IN UNLICENSED FREQUENCY BAND, AS A FUNCTION OF DISTANCE BETWEEN FIRST PCS UNIT AND ANOTHER PCS UNIT

WITHDRAWAL PROCEDURE FOR PCS UNIT 400 TO DETECT ACTIVITY OF PCS UNIT 602, COMPILE HISTORY TABLE AND TRANSMIT INTERFERENCE IN UNLICENSED FREQUENCY BAND FOLLOWED BY WITHDRAWAL OF PCS UNIT 602

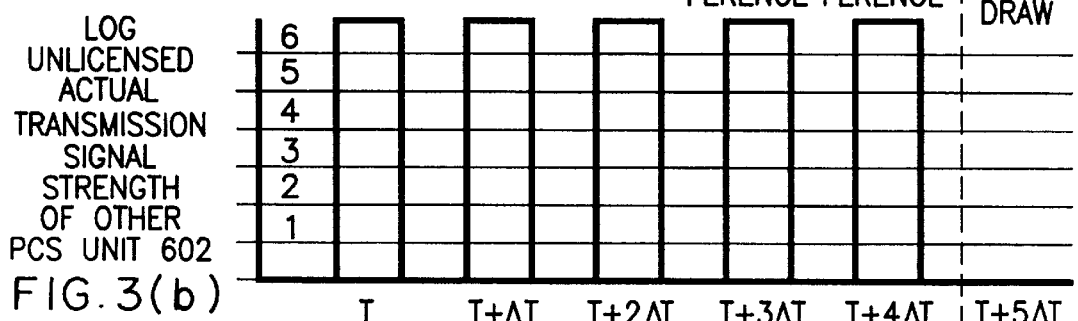

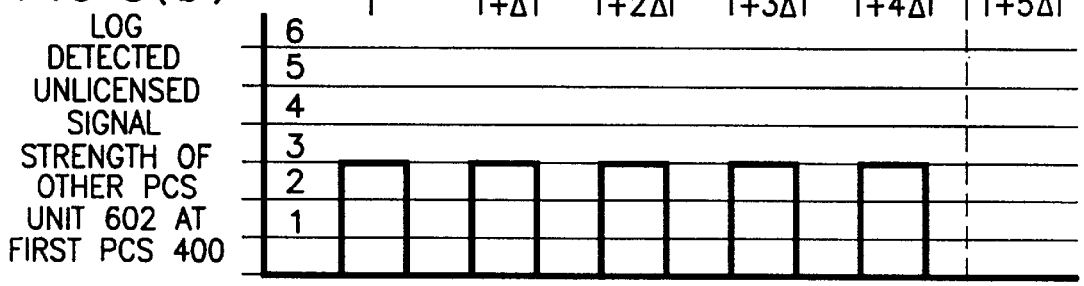

| HISTORY TABLE 300 | | | | INTER-FERENCE | INTER-FERENCE | OTHER PCS WITH-DRAWS |
|---|---|---|---|---|---|---|
| MEASURED TIME | T | T+ΔT | T+2ΔT | T+3ΔT | T+4ΔT | |
| MEASURED FREQ. | Z' | Z' | Z' | Z' | Z' | |
| MEASURED STRENGTH | S | S | S | S | S | 0 |
| PREDICTED NEXT TIME | — | — | T+2ΔT | T+3ΔT | T+4ΔT | T+5ΔT |

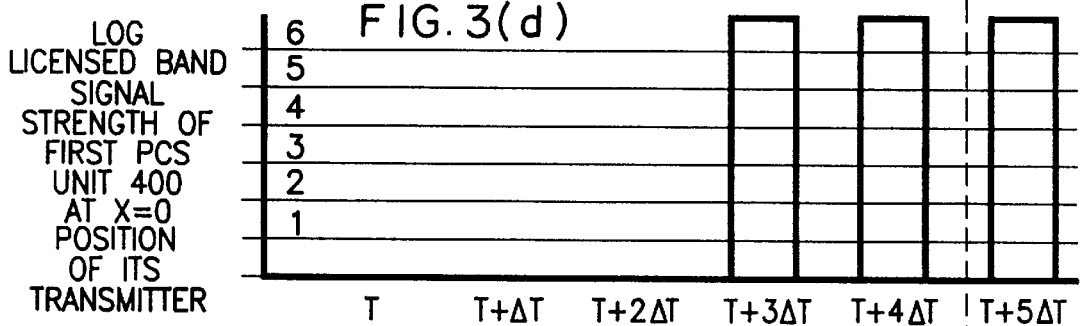

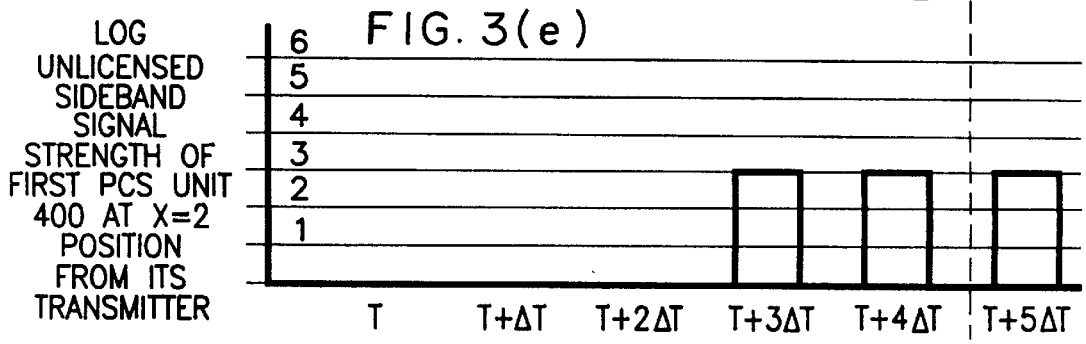

SYSTEM BLOCK DIAGRAM OF FIRST PCS UNIT

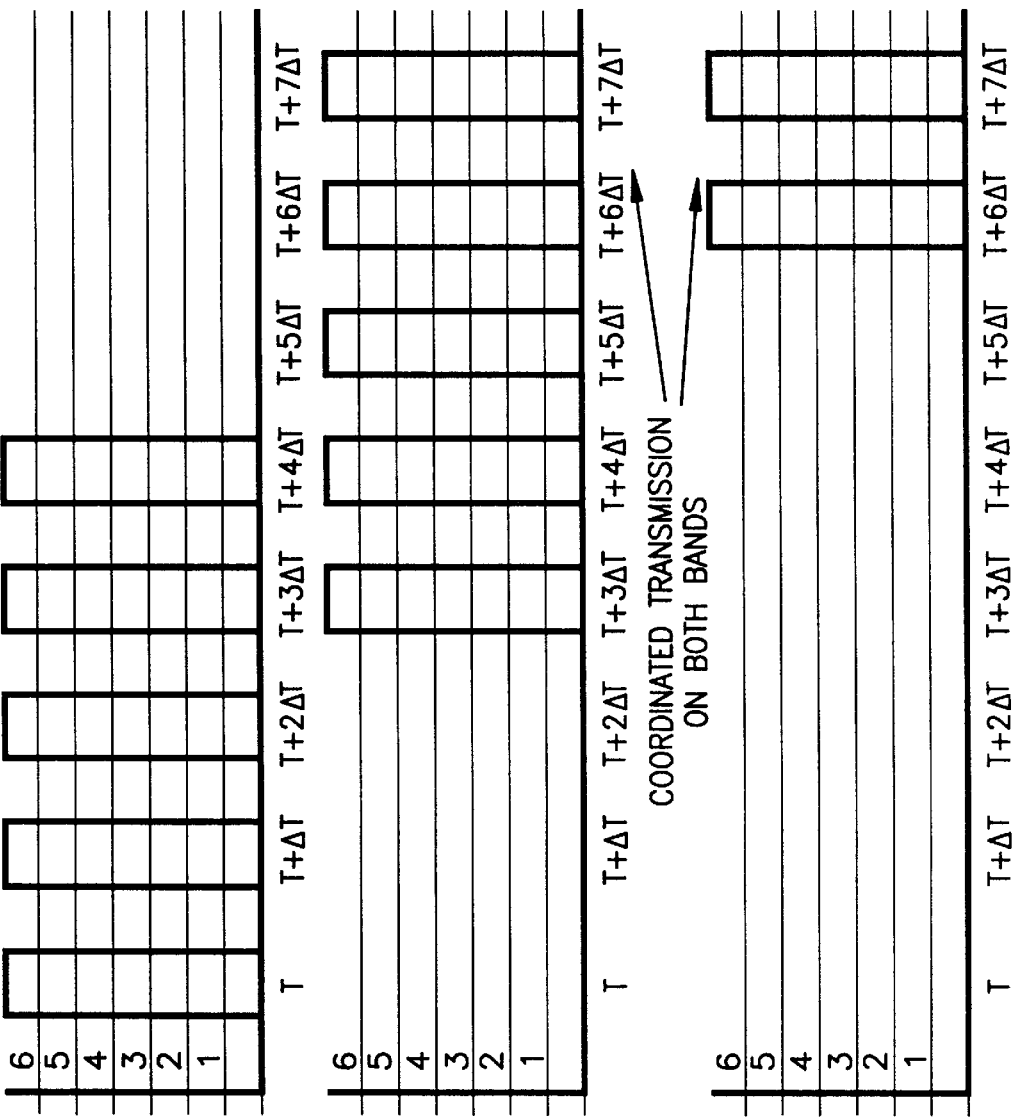

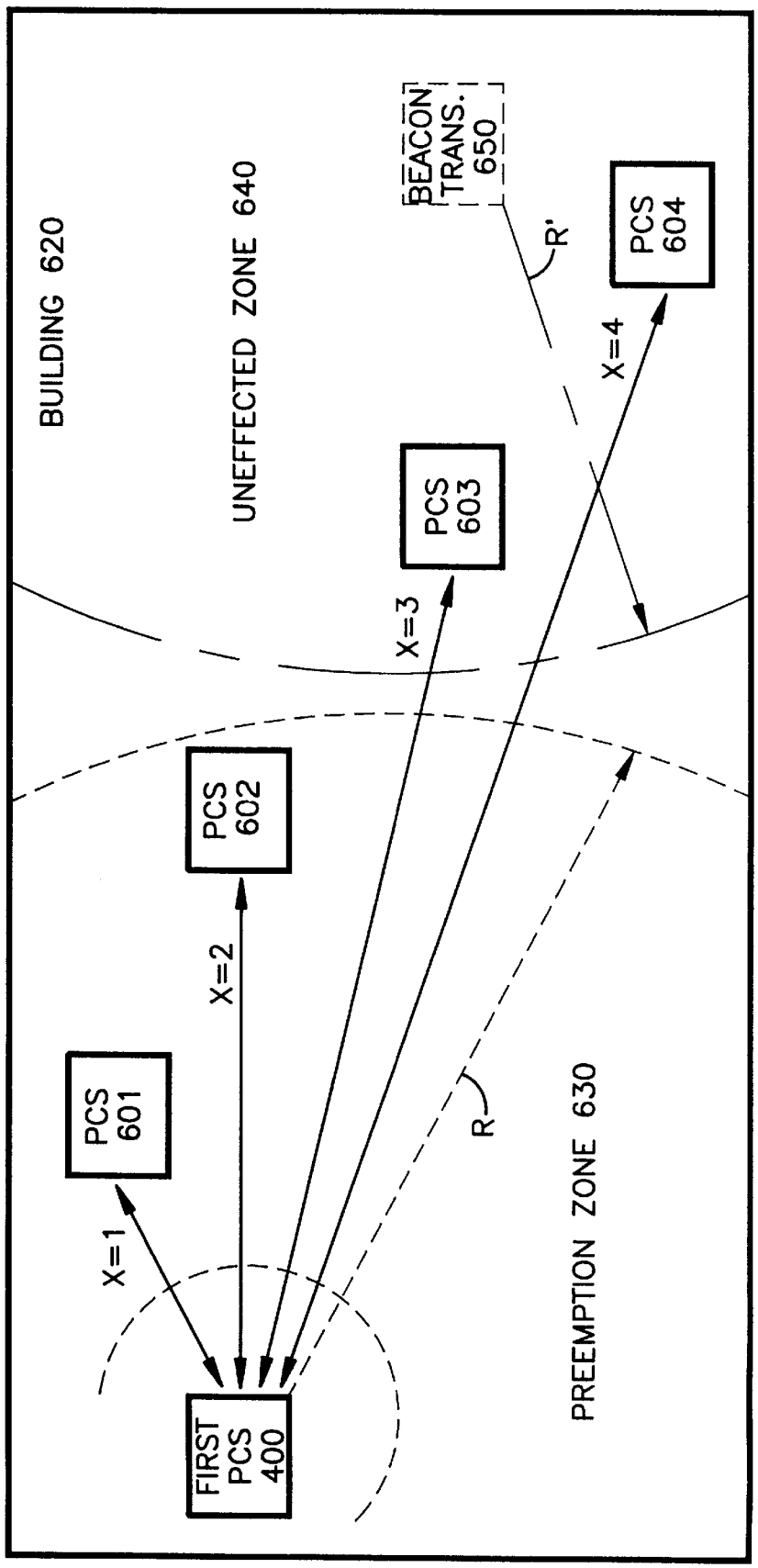
FIG. 6 GEOGRAPHIC RELATIONSHIP OF FIRST PCS UNIT 400 AND OTHER PCS UNITS

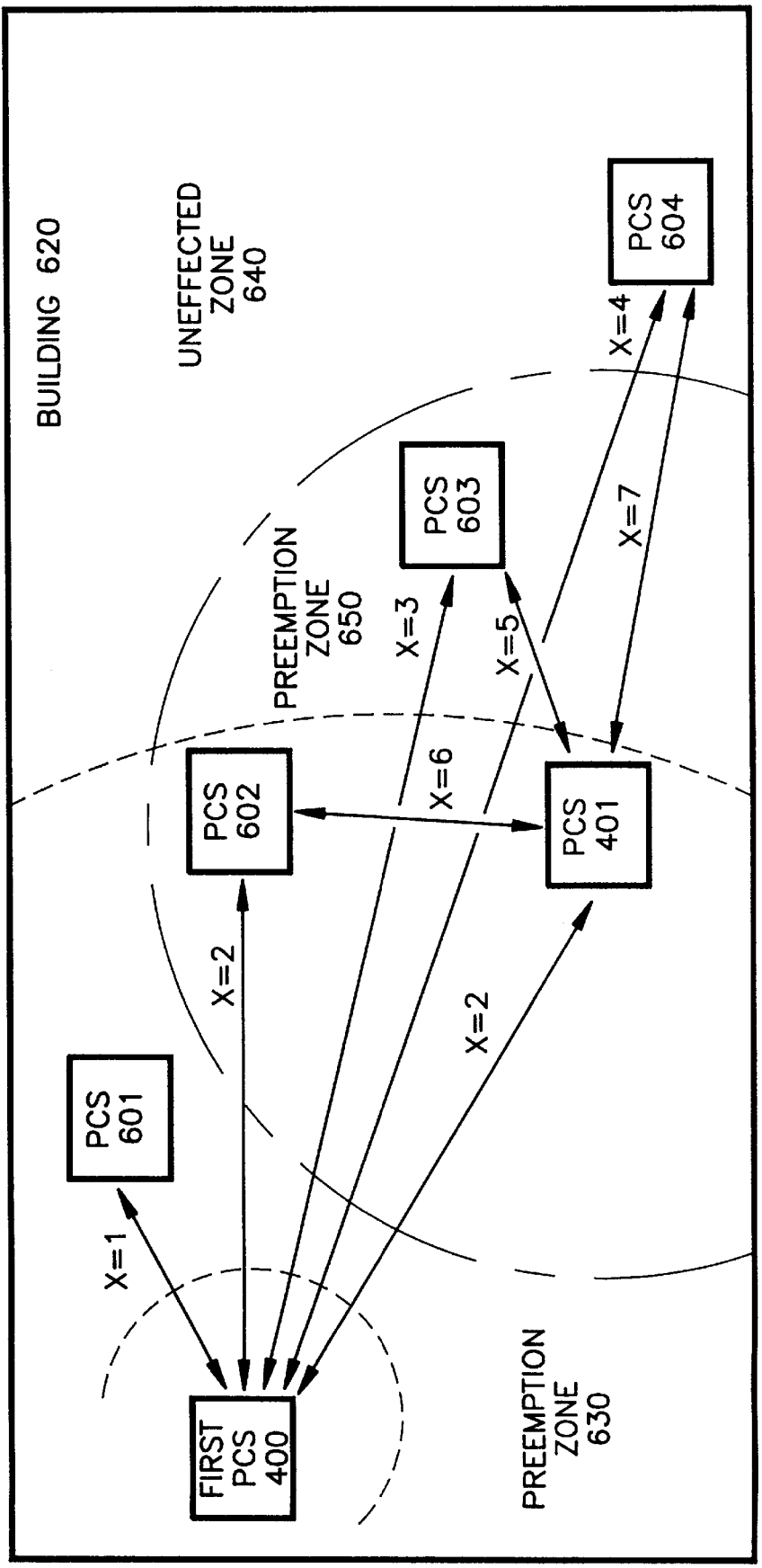

SIDEBAND SIGNAL STRENGTH IN UNLICENSED
BAND AS A FUNCTION OF DISTANCE BETWEEN
RESPONDING PCS UNIT AND OTHER UNLICENSED PCS UNITS

METHOD AND SYSTEM FOR MAKING UNLICENSED PRIORITY TRANSMISSIONS

FIELD OF THE INVENTION

The invention disclosed broadly relates to telecommunications and more particularly relates to radio communications for personal communications systems.

BACKGROUND OF THE INVENTION

In the United States, the Federal Communications Commission (FCC) has created transmission telecommunications bands for personal communications systems, hereinafter referred to as (PCS). The FCC has designated certain portions of the electromagnetic radiation spectrum as being licensed portions or bands. Licensees of these PCS licensed bands may transmit within their licensed frequency, communications signals having a wide variety of formats and signal strengths.

The FCC has also designated other frequency bands near to the licensed frequency bands as unlicensed bands. In these unlicensed bands, the requirements imposed on users of the unlicensed bands are more restrictive than are the requirements for licensed bands. In the unlicensed bands, the user must maintain a limited signal strength, and must conform to a transmission protocol which provides for carrier sensing and collision detection with other signals so that the user will withdraw his transmission during an interval that other transmissions are sensed as occurring in the unlicensed band.

A licensee of a licensed PCS band can transmit a communications signal within that frequency band which has sideband frequencies which overlap into the unlicensed PCS bands. These sideband signals in the unlicensed bands are the natural accompaniment of transmissions in the licensed band.

Since occasionally user licensees of the licensed PCS band will have a need for a higher capacity for communicating their information, it would be useful to have the ability to coordinate transmissions in the unlicensed band along with the licensed transmissions by the licensee in the licensed band.

OBJECTS OF THE INVENTION

It is therefore an object of the invention to provide a means to coordinate transmissions in the unlicensed PCS band with licensed transmissions in a licensed PCS band.

It is another object of the invention to provide a means for preempting unlicensed PCS devices which have frequencies near to the frequency of a licensed PCS band.

SUMMARY OF THE INVENTION

These and other objects, features and advantages are accomplished by the invention. The invention is a system and method for causing existing users in the unlicensed PCS band to abandon their transmissions in order to enable the licensee in an adjacent licensed PCS band to coordinate related simultaneous signals in both the licensed PCS band and the adjacent unlicensed PCS band.

In accordance with the invention, the carrier activity of other PCS units broadcasting in the adjacent unlicensed frequency band is monitored by the invention. Then, the invention compiles a history table of the time of occurrence and the sub-bands occupied by the other carriers in the adjacent unlicensed band.

Then, the invention transmits an interference signal on its own licensed frequency band with a maximum permitted power, which causes its sideband frequencies to occur naturally in the adjacent unlicensed frequency band. The invention uses the history table it has compiled to synchronize its interference signal on the licensed frequency band with the predicted occurrence of the transmissions by the other PCS units in the unlicensed frequency band. The invention then waits for the other PCS units to stop their broadcasting on the unlicensed frequency band, obeying the FCC protocol which requires that the users of the unlicensed frequency band must withdraw their participation or transmission in the band when they sense the carrier signal of another transmitter attempting to make use of that same unlicensed frequency band.

The invention thereafter senses when the other PCS units abandon their use of the unlicensed frequency band, and begins broadcasting on both its licensed frequency band and on the unlicensed frequency band. At this time, the invention can broadcast to its intended receiving PCS units that the unlicensed frequency band is now available for both of them to use in their communications sessions. The invention and its intended PCS units can then continue coordinated transmissions of simultaneous signals on both the licensed frequency band and the unlicensed frequency band, knowing that the sideband signals that they sense are from their own licensed frequency band transmissions.

By using an approved protocol to preempt the use of an unlicensed frequency band, the invention can increase the capacity of its transmissions through coordinated signal transmissions on both the unlicensed frequency band and the licensed frequency band.

The invention can also be used to establish a preemption zone around its geographic location, so that third-party PCS units within the same preemption zone will be precluded from using the unlicensed frequency band whenever the invention chooses to use that band to augment its licensed frequency band transmissions. Those PCS units which are geographically farther from the invention's location than the coverage of the preemption zone will be unaffected by the invention, and may continue their own use of the unlicensed frequency band in accordance with the FCC regulations.

In the situation where the preemption periods created by the invention's transmitter(s) would be significantly smaller than the monitored signals in the unlicensed band, the invention can transmit a maximum of overlapping signals to optimize the preemption of unlicensed transmission periods. In the situation where the preemption periods created by the invention's transmitter(s) would be significantly larger than the monitored signals in the unlicensed band, the invention can transmit a minimum of overlapping signals to optimize the preemption of unlicensed transmission periods. In the situation where the preemption periods created by the invention's transmitters would be unable to overlap, the invention can maximize the preemption periods by making the invention's transmissions on the rising and falling edges of the monitored unlicensed transmission signals.

BRIEF DESCRIPTION OF THE DRAWINGS

These and other objects, features and advantages of the invention will be more fully appreciated by reference to the accompanying drawings, in which:

FIG. 1 is a flow diagram of the invention's operation.

FIGS. 3(a)–(e) illustrate the waveforms and also illustrate the history table 300 in accordance with the invention, and show a sequence for the invention to monitor other PCS activity, compile a history table, and transmit the interference first in the licensed frequency band, which is followed by the carrier detection and withdrawal of participation by other PCS units in the unlicensed frequency band.

FIGS. 5(a)–(e are a waveform diagram illustrating how the invention begins a coordinated broadcasting on the unlicensed frequency band with its transmitter 432, and also on the licensed frequency band with its transmitter 430.

FIG. 6 is a layout diagram of a building 620 showing the relative positions of the invention and the preemption zone and also the area outside the preemption zone which may be unaffected by the operation of the invention.

FIG. 7 is a layout diagram of the building 620 showing the geographic relationships of the preemption zones of two PCS units according to the invention.

DETAILED DESCRIPTION OF THE INVENTION

The operation of the invention is illustrated by the flow diagram of FIG. 1, which shows a sequence of operational steps in carrying out the invention. Reference can also be made to FIGS. 2(a)–(e) which show the sideband signal strength in the unlicensed frequency band as a function of distance from the first PCS unit 400, and to FIG. 6 which shows other PCS units 601, 602, 603 and 604 that are not intended for receiving transmissions from PCS unit 400.

It is seen that at the location of the PCS unit 400 where the invention resides, the logarithm of the sideband signal strength at the first PCS unit 400 has six units of amplitude. At a distance X=1 in FIG. 2(b) corresponding to the location of the PCS unit 601 in FIG. 6, the logarithm of the sideband signal strength is shown to be diminished to an amplitude value of 4. Similarly, at a distance of X=2 in FIG. 2(c) corresponding to the location of the PCS unit 602 in FIG. 6, the logarithm of the sideband signal strength is seen to be further reduced to a value of 3.

Figure 2A:
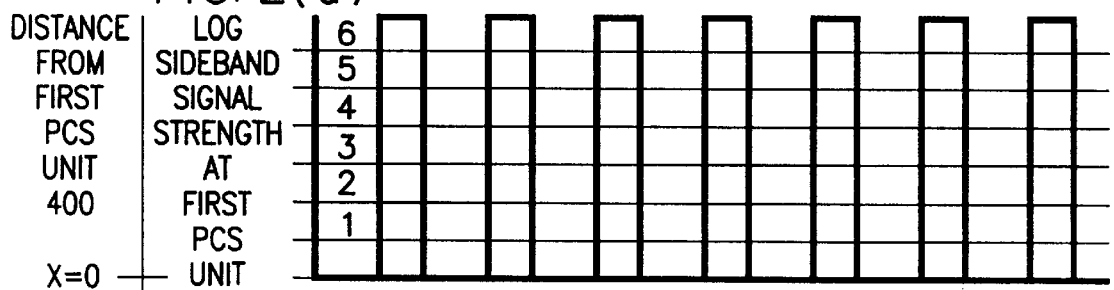
FIGS. 2(a)–(e) are a series of waveform diagrams illustrating the sideband signal strength in the unlicensed frequency band as a function of the distance between the invention location and other PCS units.
Figure 2B:
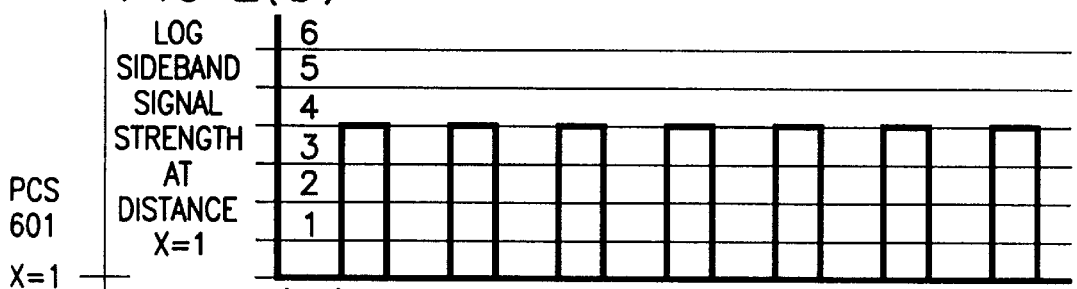
Figure 2C:
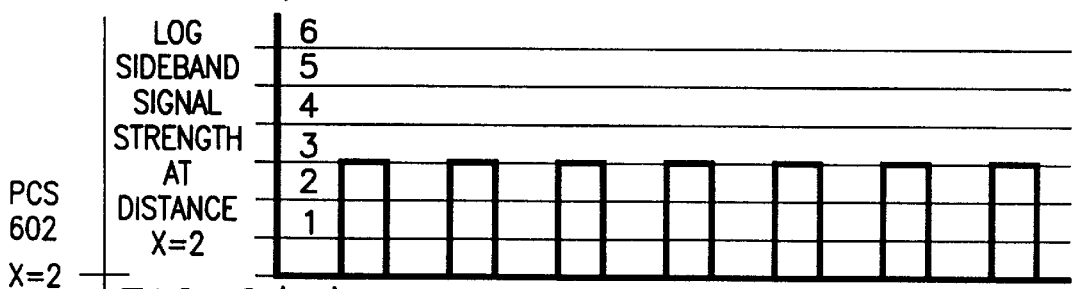
Figure 2D:
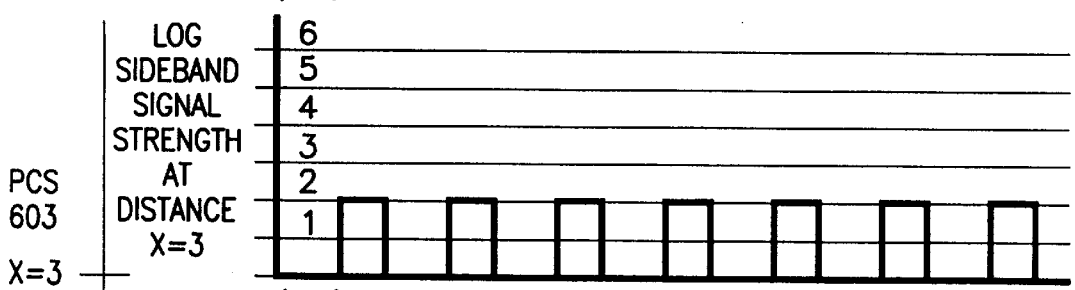
Figure 2E:
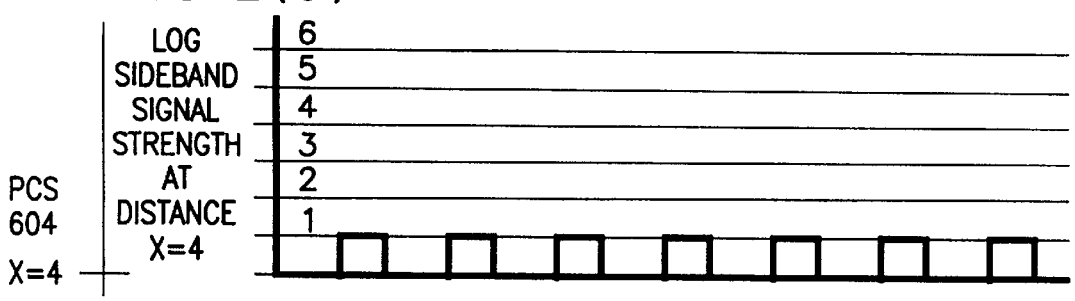

As the distance from the PCS unit 400 in FIG. 6 increases to X=3, which corresponds to the location of the PCS unit 603, the sideband signal strength is seen to be further reduced to a value of 2 in FIG. 2(d). Finally, it is seen that at a distance of X=4 corresponding to the location of the PCS unit 604 in FIG. 6, the logarithm of the sideband signal strength is further reduced to a value of 1 in FIG. 2(e). This steady progression of reductions in the sideband signal strength results in creating a zone of influence or a preemption zone 630 as shown in FIG. 6, outside of which there is an unaffected zone 640 that is unaffected by the operation of the invention 400 within the building 620.

Figure 4:
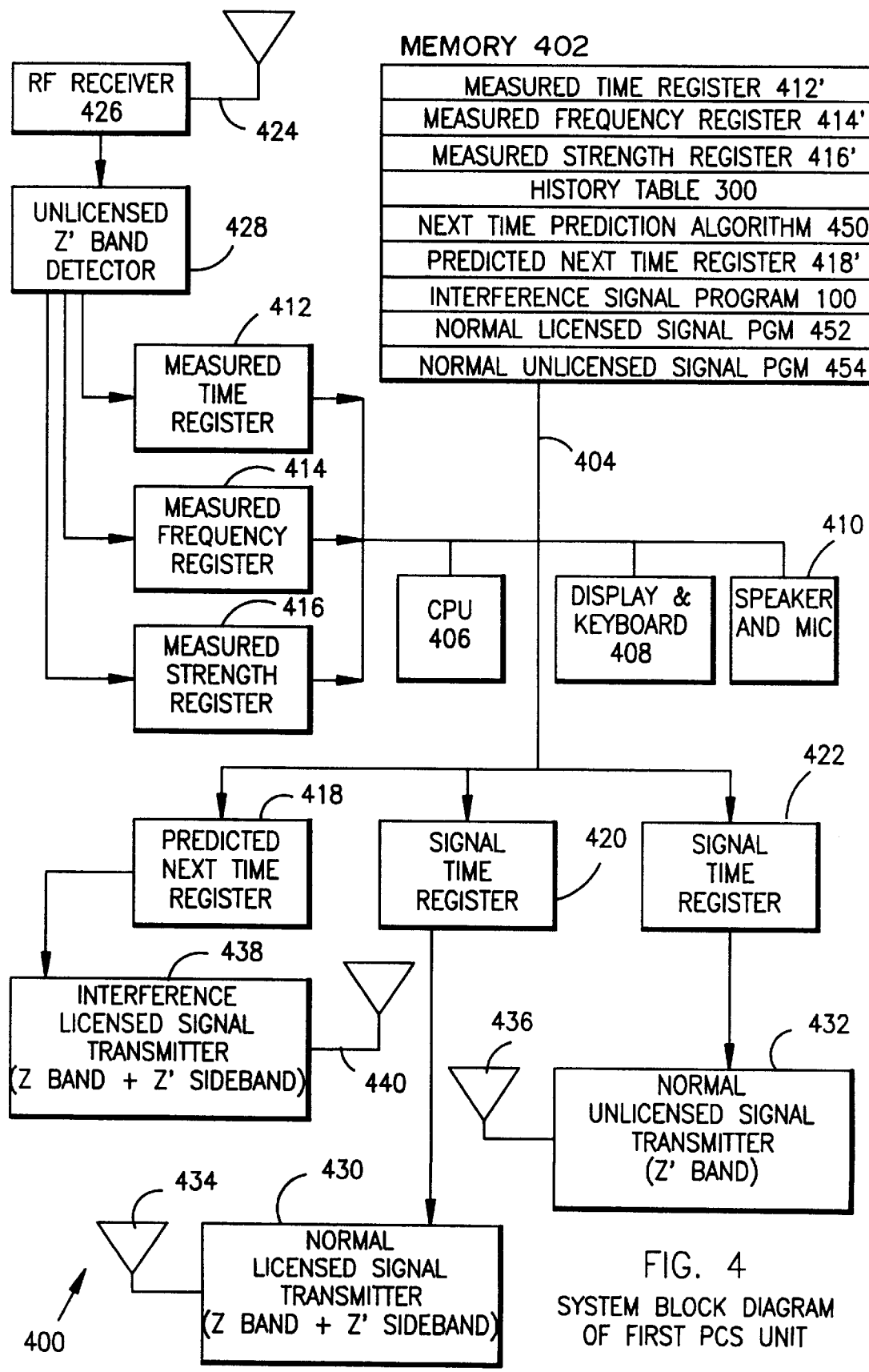
FIG. 4 is a system block diagram of the invention.
Figure 8A:
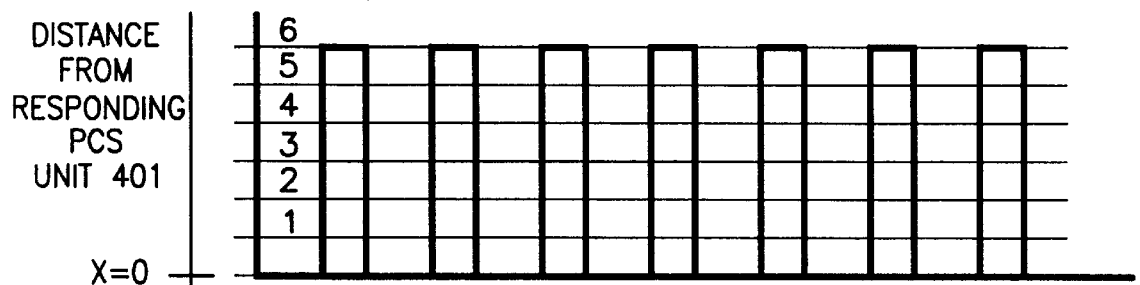
FIGS. 8(a)–(d) are a series of waveform diagrams illustrating the sideband signal strength in the unlicensed frequency band as a function of the distance between the location of an intended PCS unit 401 and other PCS units.
Figure 8B:
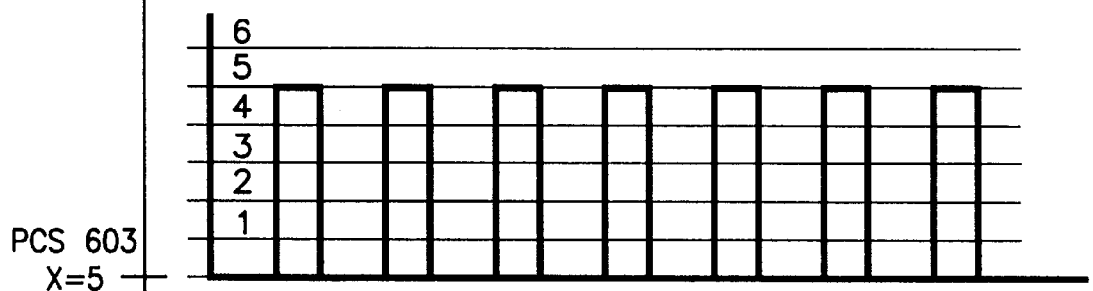
Figure 8C:
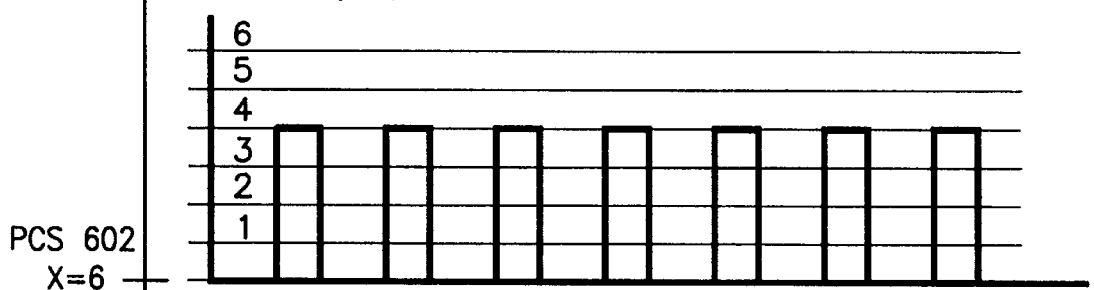
Figure 8D:
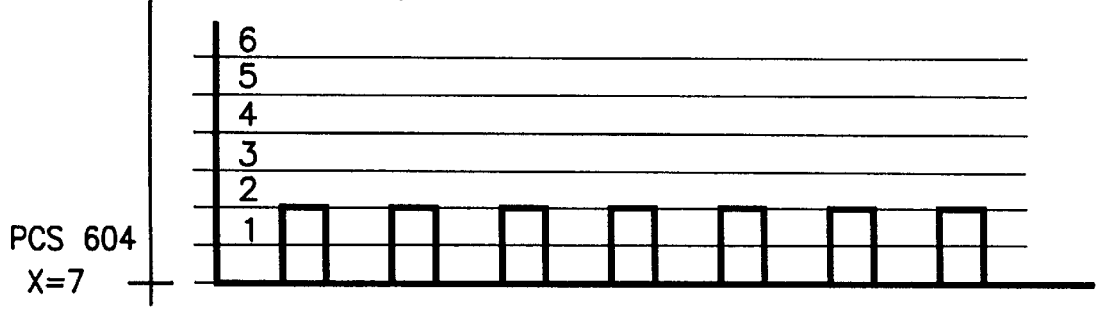

Returning now to the flow diagram of FIG. 1, the flow diagram represents a program that is embodied in the invention as part of the memory 402 of PCS unit 400, as is shown in the system block diagram of FIG. 4. In the flow diagram of FIG. 1, step 102 has the first PCS unit 400 in FIG. 4 begin normal broadcasting on the licensed PCS frequency band using its transmitter 430 and its antennae 434, producing a primary transmission signal of a frequency Z in the licensed frequency band Z and an accompanying sideband signal of a frequency in the unlicensed adjacent frequency band Z'. The permitted sideband frequencies produced by the transmitter 430 in FIG. 4 encroached into the adjacent unlicensed frequency band occupied by the other PCS units 601 and 602 in the same geographic area, as is shown in FIG. 6.

In step 104, the first PCS unit 400 monitors the carrier activity of the other PCS units 601 and 602 which are broadcasting in the adjacent unlicensed frequency band Z'.

Turning now to FIG. 4, the system block diagram of the first PCS unit 400 illustrates the principal components of the invention. An RF receiver 426 has a receiver antennae 424 and an output connected to an unlicensed Z' band detector 428, which in turn has respective outputs connected to a measured time register 412, a measured frequency register 414 and a measured strength register 416. It is also seen that the PCS unit 400 includes a memory 402 which is connected by means of a bus 404 to a CPU 406, a display and keyboard 408 (data signal means), and a speaker and microphone 410 (voice signal means).

Also connected to the bus 404 is the measured time register 412, the measured frequency register 414, and the measured strength register 416, along with a predicted next time register 418, a licensed signal time register 420 and an unlicensed signal time register 422. The normal licensed signal transmitter 430, which transmits both in the licensed frequency band Z and has sideband signals in the unlicensed frequency band Z', is connected to the licensed signal time register 420 and has transmitter antennae 434. A normal unlicensed signal transmitter 432, which will transmit signals specifically in the unlicensed frequency band Z', is connected to the unlicensed signal time register 422 and has transmitter antennae 436.

An interference licensed signal transmitter 438 transmits both in the licensed frequency band Z and has sideband signals in the unlicensed frequency band Z', and it is connected to the predicted next time register 418 and has a transmitter antennae 440. Although the interference licensed signal transmitter 438 and its antennae 440 are shown as separate components in FIG. 4, the functions of these components may optionally be performed by the normal licensed signal transmitter 430 and its antennae 434, in which case predicted next time register 418 is connected to transmitter 430 along with normal signal time register 420.

The memory 402 of the PCS unit 400 of FIG. 4 has a number of partitions, which include a measured time register partition 412' that corresponds to the measured time register 412, a measured frequency register partition 414' that corresponds to the measured frequency register 414, a measured strength register partition 416' that corresponds to the measured strength register 416, and a predicted next time register partition 418' that corresponds to the predicted next time register 418. Also included in the memory 402 is a history table 300, which is shown in greater detail in FIG. 3(c), and a next time prediction algorithm 450.

In addition, the memory 402 in the PCS 400 of FIG. 4 includes an interference signal program 100, which embodies the flow diagram of FIG. 1. Also included in the memory 402 is the normal license signal program 452 and the normal unlicensed signal program 454.

In step 104 of the flow diagram of FIG. 1, when the first PCS unit 400 monitors carrier activity of other PCS units 601 and 602 as they broadcast in the adjacent unlicensed frequency band Z', it makes use of the receiving antennae 424, the RF receiver 426, and the unlicensed Z' band detector 428 to establish the measured time, the measured frequency, and the measured signal strength for transmissions from the other PCS units 601 and 602. The values of these measured parameters are stored in the measured time register partition 412', the measured frequency register partition 414' and the measured strength register partition 416', respectively.

PCS unit 400 detects the signals of other PCS units in its vicinity and compiles a history table of the characteristics of these signals. As can be seen in the waveform diagram of FIGS. 3(*a*)–(*e*), for example, the logarithm of the unlicensed band Z' signal strength of the other PCS unit 602 at its own position is shown by the waveform of FIG. 3(*a*), and the logarithm of the corresponding signal strength as measured at the PCS unit 400 is shown by the waveform of FIG. 3(*b*). The values for measured time T, measured frequency Z' and measured signal strengths S of the other PCS unit 602 at the position of the PCS unit 400 are compiled in the history table 300 shown in FIG. 3(*c*). In accordance with the invention, the next time prediction algorithm 450 attempts to establish what the pattern is for the transmissions from the other PCS units 601 and 602 in the unlicensed frequency band Z'.

The values at measured time T and measured time T+ΔT and the corresponding measured frequencies Z' and measured signal strengths S are compiled in the history table 300. From this, the next time prediction algorithm 450 predicts that the next transmission from PCS unit 602 will occur at a time T+2ΔT. If this hypothesis turns out to be true, further predictions are made by the algorithm 450 at time increments of ΔT. In the example here, the repetition is a periodic repetition having a fixed time interval ΔT.

Many other repetition sequences are possible and may be included in the algorithm 450, or the interference signal program 100 may initiate the use of alternative algorithms. The algorithm selected simply identifies the predicted interval before measurement of the next signal and based on the accuracy of this prediction, extrapolates the repetition period or sequence for the signals from the PCS unit 602 to predict the next times that the signals will occur from this PCS unit in the unlicensed frequency band. The same determinations and predictions are made for PCS unit 601 and any other PCS units broadcasting signals above the threshold level of unlicensed Z' band detector 428.

In accordance with the flow diagram in FIG. 1, step 106 compiles the history table 300 of the time of occurrence and the subbands occupied by the other carriers in the adjacent unlicensed band. In step 108 of FIG. 1, the first PCS unit 400 uses the history table 300 to synchronize its interference signals, as transmitted by the transmitter 438 on the licensed frequency band, with the predicted occurrence of the transmissions by the other PCS units 601 and 602 in the unlicensed frequency band Z'.

Then, step 110 of the flow diagram of FIG. 1 has the first PCS unit 400 transmit an interference signal on the license frequency band using its interference transmitter 438. Accompanying the licensed frequency transmission will be sideband signal frequencies which will have the maximum permitted power for those side band frequencies in the unlicensed frequency band Z'. Reference can be made to the waveform diagrams of FIGS. 3(*a*)–(*e*) and 5(*a*)–(*c*) wherein the waveforms FIGS. 3(*c*) and 5(*b*) illustrate that at the time T+3ΔT, the first PCS unit 400 begins transmission from its transmitter 438. The corresponding signal sensed by the PCS unit 602, for example at a distance X=2 in FIG. 6, is shown in the waveform of FIG. 3(*d*).

In step 111 of FIG. 1, the intended PCS units receiving the licensed band signal transmit to the first PCS unit 400 an acknowledgement of the interference protocol on the same licensed band or on another licensed band identified by the interference protocol. Step 112 then has the first PCS unit 400 wait for the other PCS units 601 and 602 to stop broadcasting their signals on the unlicensed frequency band Z'. This will quickly occur because the PCS units 601 and 602 must conform with the FCC communications protocol requiring that they sense the carrier of other PCS units attempting to broadcast in the unlicensed frequency band and that in response to sensing that carrier, they cease their transmissions on that frequency carrier.

Then step 114 of FIG. 1 has the first PCS unit 400 begin broadcasting both on the unlicensed frequency band using its normal unlicensed signal transmitter 432 for the Z' band, and on the licensed frequency band using its normal licensed signal transmitter 430, which provides primary signals on the Z band and accompanying sideband signals on the Z' band. This operation is illustrated in the waveform diagrams of FIGS. 5(*a*)–(*c*), where the waveform 5A shows how the PCS unit 602 relinquishes its participation in transmitting signals on the unlicensed frequency band Z' at a time T+5ΔT. Thereafter, at a time T+6ΔT, the PCS unit 400, in accordance with the invention, resumes normal transmission of licensed signals from its transmitter 430 in the licensed band Z and begins normal transmission of unlicensed as shown in FIGS. 5(*b*) and 5(*c*) signals from its transmitter 432 in the unlicensed band Z' as shown in FIGS. 5(*b*) and 5(*c*).

Beginning at the time T+6ΔT and continuing thereafter, the PCS unit 400 thereby establishes coordinated transmissions of signals on both the licensed Z band and the unlicensed Z' band. The PCS 400 knows that even though it receives collision signals on its RF receiver 426 in the unlicensed Z' band, those collision signals are from the accompanying sideband components of the normal licensed signals transmitted by its transmitter 430. The PCS unit 400 therefore knows that it does not have to withdraw its transmissions of the normal unlicensed signals from its transmitter 432, since it knows it is not colliding with a signal from another PCS unit that has not responded to its interference protocol, i.e. an unintended PCS unit.

Thus, the invention enables the PCS unit 400 to preempt for its own coordinated use, the unlicensed frequency band Z' adjacent to the licensed frequency band Z within the preemption zone 630 shown in FIG. 6. Step 116 of FIG. 1 further provides that the first PCS unit 400 can broadcast to its own responding PCS units, i.e. the intended PCS units, that the unlicensed frequency band Z' is now available to those intended units for communication with the PCS unit 400. Therefore, the intended PCS units also know that they do not have to withdraw their transmissions of unlicensed signals because of unlicensed signals transmitted by transmitters 430, 432 or 438 of the first PCS unit 400.

In an optional embodiment of the invention, a beacon transmitter unit 650 connected to the first PCS unit 400 is positioned at another location within the building 620 as shown by broken lines in FIG. 6. The beacon transmitter unit 650 can provide for the transmission of both licensed and unlicensed band signals, coordinated with those from the transmitters 430, 432 and 438 in FIG. 4, to also preempt transmissions from the other PCS units 603 and 604 that are more distant than PCS units 601 and 602 from the first PCS unit 400. This enables enlargement of the preemption zone 630 into a concentric area surrounding the beacon transmitter 650 and having a radius R', which is in addition to the concentric zone 630 surrounding the first PCS unit 400 and having a radius R.

Additional beacon transmitters can be located at multiple locations within and around building 620 in FIG. 6, and can provide for the transmission of coordinated signals to enable the further enlargement of the preemption zone 630 into concentric areas surrounding each beacon transmitter.

Additionally, the responding PCS unit(s), that signal acknowledgement of receiving the interference protocol from the first PCS unit 400, may also emit signals on the licensed band with the maximum permissible power to preempt nearby devices attempting to use the unlicensed adjacent frequency band. The use of acknowledging devices using the licensed frequency band and the adjacent unlicensed frequency band further enlarges the preemption zone as shown in FIG. 7. In this figure, responding PCS unit 401 preempts unlicensed band use by the other PCS units 602, 603 and 604 at the distances X=5, X=6 and X=7, respectively, from PCS unit 401. In the waveform diagrams of FIGS. 8(a)–(d), there are shown the respective sideband signal strengths at PCS units 602, 603 and 604 of the licensed transmissions from responding PCS unit 401.

The invention therefore enables the selective augmentation of the capacity of a radio network for transmission traffic by preempting the use of unlicensed frequency bands that are adjacent to a licensed frequency band being used by a PCS unit embodying the invention.

What is claim is:

1. A system for making transmissions on unlicensed band frequencies, said system comprising:

means for making intermittent transmissions on frequencies in a licensed band such that said licensed transmissions produce sideband signals in an adjacent unlicensed band;

means for making intermittent transmissions on frequencies in said adjacent unlicensed band; and, means for coordinating said unlicensed transmissions with said licensed transmissions so that said sideband signals preempt said adjacent unlicensed band for said unlicensed transmissions by interfering with transmitters making other intermittent transmissions on frequencies in said adjacent unlicensed band.

2. A system according to claim 1 wherein said coordinating means comprises means for detecting the times at which said other intermittent transmissions occur, and means responsive to said detecting means for predicting the next time that another of said other intermittent transmissions is likely to occur; and wherein said licensed transmission means comprises means responsive to said predicting means for providing an interference transmission in said licensed band with sideband signals in said unlicensed band at substantially said predicted next time for the occurrence of said other intermittent transmissions.

3. A system according to claim 2 wherein said detecting means comprises antennae means, RF receiver means connected to said antennae means, and a detector connected to said RF receiver means for detecting said other intermittent transmissions.

4. A system according to claim 2 wherein said predicting means comprises a measured time register, and processing means having memory means with a measured time register partition for storing data provided by said measured time register, the latter having an input connected to said detecting means and an output connected to said processing means.

5. A system according to claim 4 wherein said predicting means further comprises a measured frequency register and a measured strength register, wherein said memory means includes a measured frequency register partition for storing data provided by said measured frequency register and a measured strength register partition for storing data provided by said measured strength register, and wherein said frequency and strength registers have an input connected to said detecting means and an output connected to said processing means.

6. A system according to claim 5 wherein the memory means of said processing means further comprises a history table partition wherein is stored a history of the occurrences of said other transmissions, a next time prediction algorithm, a predicted next time register partition, and an interference signal program which uses said history table partition and said next time prediction algorithm to predict the next time of said other transmissions, said next time prediction being stored in said predicted next time register partition; and wherein said predicting means further comprises a predicted next time register responsive to said interference signal program to cause said licensed transmission means to provide said licensed interference transmission with sideband signals in said unlicensed band substantially at the predicted next time for occurrence of said other intermittent transmissions.

7. A system according to claim 6 wherein said licensed transmitting means comprises a licensed time register connected to a licensed transmitter for providing said licensed transmissions; wherein said unlicensed transmission means comprises an unlicensed time register connected to an unlicensed transmitter for providing said unlicensed transmissions; wherein said memory means further comprises a normal licensed transmission program and a normal unlicensed transmission program; and wherein said licensed time register is responsive to said normal licensed transmission program and said unlicensed time register is responsive to said normal unlicensed transmission program so that unlicensed transmissions by said unlicensed transmitter are coordinated with licensed transmissions from said licensed transmitter and sideband signals accompanying said licensed transmissions preempt said adjacent unlicensed band for said unlicensed transmissions by said unlicensed transmitter.

8. A system according to claim 1 wherein said licensed transmission means comprises means for broadcasting to transceiver units intended to receive said unlicensed band transmissions message signals indicating that said sideband signals are to be ignored and that said unlicensed frequency band is thereby also available for unlicensed transmissions from said intended transceiver units, and wherein said system further comprises intended transceiver units having means responsive to said message signals for recognizing said sideband signals as those associated with said licensed transmissions.

9. A system according to claim 1 wherein said licensed transmission means includes primary transmitter means for making primary licensed transmissions and beacon transmitter means for making secondary licensed transmissions, said primary and secondary licensed transmissions being coordinated such that licensed transmissions from said primary transmitter means provide one geographic preemption zone for said unlicensed transmissions, and licensed transmissions from said beacon transmitter means provide another geographic preemption zone for said unlicensed transmissions.

10. A system according to claim 1 further comprising a receiver unit capable of recognizing said sideband signals so as to prevent a corresponding transmitter unit from withdrawing its transmissions from said adjacent unlicensed band.

11. A method for making transmissions on unlicensed band frequencies, said method comprising:

making intermittent transmissions on frequencies in a licensed band such that said licensed transmissions produce sideband signals in an adjacent unlicensed band, making intermittent transmissions on frequencies in said adjacent unlicensed band, and coordinating said unlicensed transmissions with said licensed transmissions so that said sideband signals preempt said adjacent unlicensed band for said unlicensed transmissions by interfering with other intermittent transmissions on frequencies in said adjacent unlicensed band.

12. A method according to claim 11 wherein said coordinating step comprises steps of:

monitoring carrier activity comprising said other intermittent transmissions in said adjacent unlicensed band, compiling a history table of times of occurrence of said carrier activity in the adjacent unlicensed band, and transmitting interference signal transmissions in said licensed band, said interference signal transmissions being accompanied by sideband signals in said adjacent unlicensed band, and said history table being used to synchronize said interference signal transmissions in the licensed band with a predicted occurrence of said carrier activity in the unlicensed band such that said sideband signals preempt said carrier activity in the adjacent unlicensed band in favor of said unlicensed transmissions.

13. A method according to claim 12 comprising the further steps of detecting when said carrier activity in said unlicensed band ceases in response to said interference signal transmissions, and thereafter broadcasting transmissions on frequencies in both said unlicensed band and said licensed band.

14. A method according to claim 11 comprising a further step of broadcasting to transceivers intended to receive said unlicensed band transmissions messages indicating that said sideband signals are to be ignored and that said unlicensed band is thereby also available for unlicensed transmissions from said intended transceiver units, said intended transceiver units having means for recognizing said sideband signals as those associated with said licensed transmissions.

15. A method according to claim 14 wherein said licensed transmissions comprise transmitting primary licensed transmissions from primary transmitter means and secondary licensed transmissions from intended transmitter means acknowledging a transmission protocol broadcast by said primary transmitter means, said primary and secondary licensed transmissions being coordinated such that licensed transmissions from said primary transmitter means provide one geographic preemption zone for said unlicensed transmissions, and licensed transmissions from said intended transmitter means provide another geographic preemption zone for said unlicensed transmissions.

16. A method according to claim 11 wherein said licensed transmissions comprise transmitting primary licensed transmissions from primary transmitter means and secondary licensed transmissions from beacon transmitter means, said primary and secondary licensed transmissions being coordinated such that licensed transmissions from said primary transmitter means provide one geographic preemption zone for said unlicensed transmissions, and licensed transmissions from said beacon transmitter means provide another geographic preemption zone for said unlicensed transmissions.

* * * * *